United States Patent
Derelöv et al.

(10) Patent No.: US 10,548,397 B2
(45) Date of Patent: Feb. 4, 2020

(54) PANELS COMPRISING A MECHANICAL LOCKING DEVICE AND AN ASSEMBLED PRODUCT COMPRISING THE PANELS

(71) Applicant: Välinge Innovation AB, Viken (SE)

(72) Inventors: Peter Derelöv, Helsingborg (SE); Christian Boo, Kagerod (SE)

(73) Assignee: VALINGE INNOVATION AB, Viken (SE)

( * ) Notice: Subject to any disclaimer, the term of this patent is extended or adjusted under 35 U.S.C. 154(b) by 248 days.

(21) Appl. No.: 15/415,356

(22) Filed: Jan. 25, 2017

(65) Prior Publication Data

US 2017/0208938 A1    Jul. 27, 2017

(30) Foreign Application Priority Data

Jan. 26, 2016  (SE) ...................... 1650089

(51) Int. Cl.
*A47B 47/04*  (2006.01)
*F16B 12/12*  (2006.01)
(Continued)

(52) U.S. Cl.
CPC .......... *A47B 47/042* (2013.01); *F16B 12/125* (2013.01); *F16B 12/26* (2013.01);
(Continued)

(58) Field of Classification Search
CPC ...... Y10T 403/72; F16B 12/12; F16B 12/125; F16B 12/20; F16B 12/25; F16B 12/46;
(Continued)

(56) References Cited

U.S. PATENT DOCUMENTS

| 291,032 A | 1/1884 | Cleland |
| 634,581 A | 10/1899 | Miller |

(Continued)

FOREIGN PATENT DOCUMENTS

| CH | 365 507 A | 11/1962 |
| CH | 685 276 A1 | 5/1995 |

(Continued)

OTHER PUBLICATIONS

U.S. Appl. No. 15/366,704, ** Derelöv.
(Continued)

*Primary Examiner* — Michael P Ferguson
(74) *Attorney, Agent, or Firm* — Buchanan Ingersoll & Rooney P.C.

(57) ABSTRACT

A set of panels including a first panel with a first main plane and a second panel with a second main plane. The first and the second panel are provided with a mechanical locking device for locking a first edge of the first panel to a second edge of the second panel at a junction plane, wherein the first main plane is essentially perpendicular to the second main plane and the junction plane is extending between the first main plane and the second main plane. The first edge includes an edge tongue that extends from the junction plane. The second edge includes an edge groove at the junction plane. The edge tongue is configured to cooperate with the edge groove for locking together the first and the second edges in a first direction which is perpendicular to the first main plane. The edge tongue includes a tongue groove.

13 Claims, 4 Drawing Sheets

(51) Int. Cl.
*F16B 12/46* (2006.01)
*F16B 12/26* (2006.01)
*A47B 88/90* (2017.01)

(52) U.S. Cl.
CPC ............ *F16B 12/46* (2013.01); *A47B 88/941* (2017.01); *A47B 2088/902* (2017.01)

(58) Field of Classification Search
CPC ......... F16B 2012/145; F16B 2012/466; A47B 47/0075; A47B 47/0091; A47B 47/045; A47B 47/047; A47B 96/201; A47B 2230/0074; A47B 2230/0077; A47B 2230/0081
See application file for complete search history.

(56) References Cited

U.S. PATENT DOCUMENTS

| | | |
|---|---|---|
| 701,000 A | 5/1902 | Ahrens |
| 861,911 A | 7/1907 | Stewart |
| 881,673 A | 3/1908 | Ellison |
| 1,533,099 A * | 4/1925 | Carroll ................. E06B 3/9845 403/231 |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,360,451 A | 10/1944 | Stone |
| 2,362,904 A | 11/1944 | Kramer |
| 2,496,184 A | 1/1950 | Von Canon |
| 2,681,483 A | 6/1954 | Morawetz |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,742,807 A | 7/1973 | Manning |
| 3,765,465 A | 10/1973 | Gulistan |
| 3,784,271 A | 1/1974 | Schreiber |
| 3,884,002 A | 5/1975 | Logie |
| 3,885,845 A | 5/1975 | Krieks |
| 3,981,118 A | 9/1976 | Johnson et al. |
| 4,089,614 A | 5/1978 | Harley |
| 4,099,687 A | 7/1978 | Mackenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crowder |
| 4,279,397 A | 7/1981 | Larsson |
| 4,299,067 A | 11/1981 | Bertschi |
| 4,308,961 A | 1/1982 | Kunce |
| 4,324,517 A | 4/1982 | Dey |
| 4,403,886 A | 9/1983 | Hauesler |
| 4,405,253 A | 9/1983 | Stockum |
| 4,509,648 A | 4/1985 | Govang |
| 4,593,734 A | 6/1986 | Wallace |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,581 A | 3/1990 | Haheeb |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,360,121 A | 11/1994 | Sothman |
| 5,375,802 A | 12/1994 | Branham, II |
| 5,423,155 A | 6/1995 | Bauer |
| 5,451,102 A | 9/1995 | Chuan |
| 5,458,433 A | 10/1995 | Statsny |
| 5,471,804 A | 12/1995 | Winter, IV |
| 5,475,960 A | 12/1995 | Lindal |
| 5,499,667 A | 3/1996 | Nakanishi |
| 5,499,886 A | 3/1996 | Short et al. |
| 5,507,331 A | 4/1996 | Nakanishi |
| 5,527,103 A | 6/1996 | Pittman |
| 5,658,086 A | 8/1997 | Brokaw et al. |
| 5,711,115 A | 1/1998 | Wirt |
| 5,775,521 A | 7/1998 | Tisbo |
| 5,810,505 A | 9/1998 | Henriott |
| 5,893,617 A | 4/1999 | Lee |
| 5,941,026 A | 8/1999 | Eisenreich et al. |
| 5,944,294 A | 8/1999 | Baer |
| 5,950,389 A | 9/1999 | Porter |
| 6,050,426 A | 4/2000 | Leurdijk |
| 6,142,436 A | 11/2000 | Thurston et al. |
| 6,312,186 B1 | 11/2001 | Röck et al. |
| 6,363,645 B1 | 4/2002 | Hunter |
| 6,413,007 B1 | 7/2002 | Lambright |
| 6,491,172 B2 | 12/2002 | Chance |
| 6,505,452 B1 | 1/2003 | Hannig |
| 6,547,086 B1 | 4/2003 | Harvey |
| 6,578,498 B1 | 6/2003 | Draudt et al. |
| 6,675,979 B2 | 1/2004 | Taylor |
| D486,676 S | 2/2004 | Campbell et al. |
| 6,769,219 B2 | 8/2004 | Schwitte et al. |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan |
| 7,223,045 B2 | 5/2007 | Migli |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,614,350 B2 | 11/2009 | Tuttle et al. |
| 7,621,092 B2 | 11/2009 | Groeke et al. |
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger |
| 7,998,549 B2 | 8/2011 | Susnjara |
| 8,033,074 B2 | 10/2011 | Pervan |
| 8,038,363 B2 | 10/2011 | Hannig |
| 8,042,311 B2 | 10/2011 | Pervan |
| 8,146,754 B2 | 4/2012 | Apgood |
| 8,220,217 B2 | 7/2012 | Muehlebach |
| 8,234,830 B2 | 8/2012 | Pervan |
| 8,365,499 B2 | 2/2013 | Nilsson et al. |
| 8,387,327 B2 | 3/2013 | Pervan |
| 8,464,408 B2 | 6/2013 | Hazzard |
| 8,495,849 B2 | 7/2013 | Pervan |
| 8,505,257 B2 | 8/2013 | Boo et al. |
| 8,544,230 B2 | 10/2013 | Pervan |
| 8,596,013 B2 | 12/2013 | Boo |
| 8,602,227 B1 | 12/2013 | McDonald |
| 8,615,952 B2 | 12/2013 | Engström |
| 8,713,886 B2 | 5/2014 | Pervan |
| 8,745,952 B2 | 6/2014 | Perra |
| 8,764,137 B2 | 7/2014 | Fehre |
| 8,776,473 B2 | 7/2014 | Pervan |
| 8,833,028 B2 | 9/2014 | Whispell et al. |

(56) References Cited

U.S. PATENT DOCUMENTS

| | | |
|---|---|---|
| 8,864,407 B1 | 10/2014 | Sorum |
| 8,882,416 B2 | 11/2014 | Baur et al. |
| 8,887,468 B2 | 11/2014 | HåKansson et al. |
| 9,175,703 B2 | 11/2015 | Maertens |
| 9,216,541 B2 | 12/2015 | Boo |
| 9,290,948 B2 | 3/2016 | Cappelle et al. |
| 9,375,085 B2 | 6/2016 | Derelöv |
| 9,538,842 B2 | 1/2017 | HåKansson et al. |
| 9,655,442 B2 | 5/2017 | Boo et al. |
| 9,700,157 B2 | 7/2017 | Keyvanloo |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2 | 4/2018 | Derelöv |
| 10,034,541 B2 | 7/2018 | Boo et al. |
| 10,202,996 B2 | 2/2019 | HåKansson et al. |
| 10,415,613 B2 | 9/2019 | Boo |
| 10,448,739 B2 | 10/2019 | Derelöv et al. |
| 10,451,097 B2 | 10/2019 | BrÄNnstrÖM et al. |
| 10,486,245 B2 | 11/2019 | Fridlund |
| 2002/0170258 A1 | 11/2002 | Schwitte et al. |
| 2004/0165946 A1 | 8/2004 | Areh et al. |
| 2005/0042027 A1 | 2/2005 | Migli |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2007/0028547 A1 | 2/2007 | Grafenauer et al. |
| 2008/0010937 A1 | 1/2008 | Pervan et al. |
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 | 10/2008 | Hannig |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0173122 A1 | 7/2010 | Susnjara |
| 2010/0289389 A1 | 11/2010 | Crabtree, II |
| 2011/0225921 A1 | 9/2011 | Schulte |
| 2011/0225922 A1 | 9/2011 | Pervan et al. |
| 2011/0280655 A1 | 11/2011 | Maertens et al. |
| 2011/0283650 A1 | 11/2011 | Pervan et al. |
| 2012/0009383 A1 | 1/2012 | Hardesty |
| 2012/0027967 A1 | 2/2012 | Maertens et al. |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2013/0287484 A1 | 10/2013 | Phillips |
| 2014/0013919 A1 | 1/2014 | Gerke et al. |
| 2014/0055018 A1 | 2/2014 | Shein et al. |
| 2014/0111076 A1 | 4/2014 | Devos |
| 2014/0286701 A1 | 9/2014 | Sauer |
| 2014/0294498 A1 | 10/2014 | Logan |
| 2015/0034522 A1 | 2/2015 | Itou et al. |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2015/0230600 A1 | 8/2015 | Schulte |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0283430 A1 | 10/2018 | Leistert |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0195256 A1 | 6/2019 | Derelöv |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |

FOREIGN PATENT DOCUMENTS

| | | |
|---|---|---|
| CH | 696 889 A5 | 1/2008 |
| CH | 698 988 B1 | 12/2009 |
| CH | 705 082 A2 | 12/2012 |
| CN | 101099618 A | 1/2008 |
| CN | 203424576 U | 2/2014 |
| DE | 26 35 237 A | 2/1978 |
| DE | 228 872 A1 | 10/1985 |
| DE | 42 29 115 A1 | 3/1993 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2008 011 589 U1 | 11/2008 |
| DE | 20 2009 008 825 U1 | 10/2009 |
| DE | 10 2008 035 293 A1 | 2/2010 |
| DE | 10 2009 041 142 A1 | 3/2011 |
| DE | 31 03 281 A1 | 8/2012 |
| DE | 10 2011 057 018 A1 | 6/2013 |
| DE | 10 2014 110 124 A1 | 1/2016 |
| DE | 20 2017 101 856 U1 | 4/2017 |
| EP | 0 060 203 A2 | 9/1982 |
| EP | 0 060 203 A3 | 9/1982 |
| EP | 0 357 129 A1 | 3/1990 |
| EP | 0 362 968 A | 4/1990 |
| EP | 0 675 332 A2 | 10/1995 |
| EP | 0 871 156 A2 | 10/1998 |
| EP | 0 935 076 A1 | 8/1999 |
| EP | 1 048 423 A2 | 11/2000 |
| EP | 1 048 423 B9 | 5/2005 |
| EP | 1 671 562 A1 | 5/2005 |
| EP | 1 650 375 A1 | 4/2006 |
| EP | 1 863 984 A1 | 12/2007 |
| EP | 1 922 954 A1 | 5/2008 |
| EP | 2 017 403 A2 | 1/2009 |

(56) References Cited

FOREIGN PATENT DOCUMENTS

| | | |
|---|---|---|
| EP | 2 037 128 A1 | 3/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| FR | 2 062 731 A5 | 6/1971 |
| FR | 2 517 187 A1 | 6/1983 |
| FR | 2 597 173 A1 | 10/1987 |
| FR | 2 602 013 A1 | 1/1988 |
| GB | 1 022 377 A | 3/1966 |
| GB | 2 163 825 A | 3/1986 |
| GB | 2 482 213 A | 1/2012 |
| GB | 2 520 927 A | 6/2015 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 90/07066 | 6/1990 |
| WO | WO 99/22150 A1 | 5/1999 |
| WO | WO 00/66856 A1 | 11/2000 |
| WO | WO 01/02670 A1 | 1/2001 |
| WO | WO 01/51733 A1 | 7/2001 |
| WO | WO 01/53628 A1 | 7/2001 |
| WO | WO 02/055809 A1 | 7/2002 |
| WO | WO 02/055810 A1 | 7/2002 |
| WO | WO 03/016654 A1 | 2/2003 |
| WO | WO 03/027510 A2 | 4/2003 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/103500 A1 | 10/2006 |
| WO | WO 2006/104436 A1 | 10/2006 |
| WO | WO 2007/015669 A2 | 2/2007 |
| WO | WO 2007/015669 A3 | 2/2007 |
| WO | WO 2007/079548 A1 | 7/2007 |
| WO | WO 2008/004960 A2 | 1/2008 |
| WO | WO 2008/004960 A8 | 1/2008 |
| WO | WO 2008/017281 A1 | 2/2008 |
| WO | WO 2008/017301 A2 | 2/2008 |
| WO | WO 2008/017301 A3 | 2/2008 |
| WO | WO 2008/150234 A1 | 12/2008 |
| WO | WO 2010/023042 A1 | 3/2010 |
| WO | WO 2010/070472 A2 | 6/2010 |
| WO | WO 2010/070472 A3 | 6/2010 |
| WO | WO 2010/070605 A2 | 6/2010 |
| WO | WO 2010/070605 A3 | 6/2010 |
| WO | WO 2010/082171 A2 | 7/2010 |
| WO | WO 2010/087752 A1 | 8/2010 |
| WO | WO 01/02669 A1 | 1/2011 |
| WO | WO 2011/012104 A2 | 2/2011 |
| WO | WO 2011/012104 A3 | 2/2011 |
| WO | WO 2011/085710 A1 | 7/2011 |
| WO | WO 2011/151737 A2 | 12/2011 |
| WO | WO 2011/151737 A3 | 12/2011 |
| WO | WO 2011/151737 A9 | 12/2011 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/093636 A2 | 6/2013 |
| WO | WO 2013/093636 A3 | 6/2013 |
| WO | WO 2013/118075 A1 | 8/2013 |
| WO | WO 2014/072080 A1 | 5/2014 |
| WO | WO 2014/108114 A1 | 7/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2017/131574 A1 | 8/2017 |
| WO | WO 2017/135874 | 8/2017 |
| WO | WO 2018/080387 A1 | 5/2018 |

OTHER PUBLICATIONS

U.S. Appl. No. 15/422,798, **Fridlund.
U.S. Appl. No. 15/428,469, **Fridlund.
U.S. Appl. No. 15/428,504, **Boo.
U.S. Appl. No. 15/432,190, **Fridlund.
Derelöv, Peter, U.S. Appl. No. 15/366,704 entitled "Panels Comprising a Mechanical Locking Device and an Assembled Product Comprising the Panels", filed Dec. 1, 2016.
Fridlund, Magnus, U.S. Appl. No. 15/422,798 entitled "Set of Panels for an Assembled Product," filed Feb. 2, 2017.
Fridlund, Magnus, U.S. Appl. No. 15/428,469 entitled "Element and Method for Providing Dismantling Groove," filed Feb. 9, 2017.
Boo, Christian. U.S. Appl. No. 15/428,504 entitled "Set of Panel-Shaped Elements for a Composed Element," filed Feb. 9, 2017.
Fridlund, Magnus, U.S. Appl. No. 15/432,190 entitled "Method for Forming a Panel," filed Feb. 14, 2017.
U.S. Appl. No. 15/956,949, Peter Derelöv, filed Apr. 19, 2018.
U.S. Appl. No. 15/978,630, Jonas Fransson, Niclas Håkansson and and Agne Pålsson, filed May 14, 2018.
U.S. Appl. No. 16/027,479, Christian Boo and Peter Derelöv, filed Jul. 5, 2018.
U.S. Appl. No. 15/956,949.
U.S. Appl. No. 15/978,630.
U.S. Appl. No. 16/027,479.
Derelöv, Peter, U.S. Appl. No. 15/956,949 entitled "Panels for an Assembled Product", filed Apr. 19, 2018.
Fransson, Jonas, et al., U.S. Appl. No. 15/978,630 entitled "Elements and a Locking Device for an Assembled Product," filed May 14, 2018.
Boo, Christian, et al., U.S. Appl. No. 16/027,479 entitled "Panels Comprising a Mechanical Locking Device and an Assembled Product Comprising the Panels," filed Jul. 5, 2018.
U.S. Appl. No. 16/220,574, Peter Derelöv, filed Dec. 14, 2018.
U.S. Appl. No. 16/220,585, Peter Derelöv, filed Dec. 14, 2018.
U.S. Appl. No. 16/228,975, Niclas Håkansson and Darko Pervan, filed Dec. 21, 2018.
U.S. Appl. No. 16/220,574.
U.S. Appl. No. 16/220,585.
U.S. Appl. No. 16/228,975.
Derelöv, Peter, U.S. Appl. No. 16/220,574 entitled "Set of Panels," filed Dec. 14, 2018.
Derelöv, Peter, U.S. Appl. No. 16/220,585 entitled "Set of Panels," filed Dec. 14, 2018.
Håkansson, Niclas, et al., U.S. Appl. No. 16/228,975 entitled "Mechanical Locking System for Building Panels," filed Dec. 21, 2018.
U.S. Appl. No. 15/642,757, Peter Derelöv, filed Jul. 6, 2017
U.S. Appl. No. 15/584,633, Christian Boo, filed May 2, 2017
U.S. Appl. No. 15/646,714, Peter Derelöv, filed Jul. 11, 2017.
U.S. Appl. No. 15/562,254, Peter Derelöv, filed Sep. 27, 2017.
U.S. Appl. No. 15/567,507, Christian Boo, Peter Derelöv and Agne Pålsson, filed Oct. 18, 2017.
U.S. Appl. No. 15/794,491, Peter Derelöv, filed Oct. 26, 2017.
U.S. Appl. No. 15/848,164, Jonas Fransson, Andreas Blomgren and Karl Erikson, filed Dec. 20, 2017.
U.S. Appl. No. 15/923,701, Peter Derelöv, filed Mar. 16, 2018.
U.S. Appl. No. 15/646,714.
U.S. Appl. No. 15/562,254.
U.S. Appl. No. 15/567,507.
U.S. Appl. No. 15/794,491.
U.S. Appl. No. 15/848,164.
U.S. Appl. No. 15/923,701.
International Search Report/Written Opinion dated Apr. 11, 2017 in PCT/SE2017/050067, ISA/SE, Patent-och registreringsverket, Stockholm, SE, 12 pages.

(56) References Cited

OTHER PUBLICATIONS

Derelöv, Peter, et al., U.S. Appl. No. 15/646,714 entitled "Assembled Product and a Method of Assembling the Product", filed Jul. 11, 2017.
Derelöv, Peter, U.S. Appl. No. 15/562,254 entitled "Panel with a Slider", filed Sep. 27, 2017.
Boo, Christian, et al., U.S. Appl. No. 15/567,507 entitled "Panel With a Fastening Device," filed Oct. 18, 2017.
Derelöv, Peter, U.S. Appl. No. 15/794,491 entitled "Set of Panels with a Mechanical Locking Device", filed Oct. 26, 2017.
Fransson, Jonas, et al., U.S. Appl. No. 15/848,164 entitled "Device for Inserting a Tongue", filed Dec. 20, 2017.
Derelöv, Peter, U.S. Appl. No. 15/923,701 entitled "Panels Comprising a Mechanical Locking Device and an Assembled Product Comprising the Panels", filed Mar. 16, 2018.
U.S. Appl. No. 16/361,609, Peter Derelöv, Johan Svensson and Lars Gunnarsson, filed Mar. 22, 2019.
U.S. Appl. No. 16/386,732, Christian Boo, filed Apr. 17, 2019.
U.S. Appl. No. 16/386,810, Christian Boo, filed Apr. 17, 2019.
U.S. Appl. No. 16/386,824, Christian Boo, filed Apr. 17, 2019.
U.S. Appl. No. 16/386,874, Peter Derelöv, filed Apr. 17, 2019.
U.S. Appl. No. 16/361,609.
U.S. Appl. No. 16/386,732.
U.S. Appl. No. 16/366,810.
U.S. Appl. No. 16/386,824.
U.S. Appl. No. 16/386,874.
Derelöv, Peter, et al., U.S. Appl. No. 16/361,609 entitled "Panels Comprising a Mechanical Locking Device and an Assembled Product Comprising the Panels," filed Mar. 22, 2019.
Boo, Christian, U.S. Appl. No. 16/386,732 entitled "Set of Panels With a Mechanical Locking Device," filed Apr. 17, 2019.
Boo, Christian, U.S. Appl. No. 16/386,810 entitled "Set of Panels With a Mechanical Locking Device," filed Apr. 17, 2019.
Boo, Christian, U.S. Appl. No. 16/386,824 entitled "Set of Panels With a Mechanical Locking Device," filed Apr. 17, 2019.
Derelöv, Peter, U.S. Appl. No. 16/386,874 entitled "Symmetric Tongue and T-Cross," filed Apr. 17, 2019.
Extended European Search Report issued in EP Application No. 17744648.1, dated Jul. 8, 2019, European Patent Office, Munich, DE, 9 pages.
U.S. Appl. No. 16/553,325, Peter Derelöv and Jonas Svensson, filed Aug. 28, 2019.
U.S. Appl. No. 16/553,350, Peter Derelöv and Jonas Svensson, filed Aug. 28, 2019.
U.S. Appl. No. 16/564,438, Hans Brännström, Agne Pålsson and Peter Derelöv, filed Sep. 9, 2019.
U.S. Appl. No. 16/567,436, Peter Derelöv and Mats Nilsson, filed Sep. 11, 2019.
U.S. Appl. No. 16/553,325.
U.S. Appl. No. 16/553,350.
U.S. Appl. No. 16/564,438.
U.S. Appl. No. 16/567,436.
Brännström, Hans, et al., U.S. Appl. No. 16/564,438 entitled "Assembled Product and a Method of Assembling the Assembled Product," filed Sep. 9, 2019.
Derelöv, Peter, U.S. Appl. No. 16/567,436 entitled "Panels Comprising a Mechanical Locking Device and an Assembled Product Comprising the Panels," filed Sep. 11, 2019.
Derelöv, Peter, U.S. Appl. No. 16/553,325 entitled "Set of Panels with a Mechanical Locking Device," filed Aug. 28, 2019.
Derelöv, Peter, U.S. Appl. No. 16/553,350 entitled "Set of Panels with a Mechanical Locking Device," filed Aug. 28, 2019.
U.S. Appl. No. 16/663,603, Magnus Fridlund, filed Oct. 25, 2019.
U.S. Appl. No. 16/697,335, Christian Boo and Peter Derelöv, filed Nov. 27, 2019.
Fridlund, Magnus, U.S. Appl. No. 16/663,603 entitled "Element and Method for Providing Dismantling Groove," filed in the U.S. Patent and Trademark Office dated Oct. 25, 2019.
Boo, Christian, et al., U.S. Appl. No. 16/697,335 entitled "Panels Comprising a Mechanical Locking Device and an Assembled Product Comprising the Panels," filed in the U.S. Patent and Trademark Office dated Nov. 27, 2019.

* cited by examiner

PANELS COMPRISING A MECHANICAL LOCKING DEVICE AND AN ASSEMBLED PRODUCT COMPRISING THE PANELS

CROSS REFERENCE TO RELATED APPLICATIONS

The present application claims the benefit of Swedish Application No. 1650089-4, filed on Jan. 26, 2016. The entire contents of Swedish Application No. 1650089-4 are hereby incorporated herein by reference in their entirety.

TECHNICAL FIELD

Embodiments of the present invention relates to panels that may be arranged perpendicular to each other and locked together with a mechanical locking device. The panels may be assembled and locked together to obtain a furniture product, such as a bookshelf, a cupboard, a wardrobe, a box, a drawer or a furniture component. The locking device may comprise a flexible tongue.

BACKGROUND

A furniture product provided with a mechanical locking device is known in the art, as evidenced by WO2015/038059. The furniture comprises a first panel connected perpendicular to a second panel by a mechanical locking device comprising a flexible tongue in an insertion groove.

SUMMARY

One object of certain embodiments of the present invention to provide an improvement over the above described technique and the known art. A specific objective is to improve assembling of panels, such as furniture panels, locked together by a mechanical locking device and/or to increase the strength of the mechanical locking device. The panels may be a part of a furniture product, such as a furniture component, a drawer, a cupboard, a bookshelf, a wardrobe, a kitchen fixture, or a box.

At least some of these and other objects and advantages that will be apparent from the description have been achieved by a first aspect of the invention that includes a set of panels comprising a first panel with a first main plane and a second panel with a second main plane. The first and the second panel are provided with a mechanical locking device for locking a first edge of the first panel to a second edge of the second panel at a junction plane. The first main plane is essentially perpendicular to the second main plane and the junction plane is extending between the first main plane and the second main plane. The first edge comprises an edge tongue that extends from the junction plane. The second edge comprises an edge groove at the junction plane. The edge tongue is configured to cooperate with the edge groove for locking together the first and the second edges in a first direction which is perpendicular to the first main plane. The edge tongue comprises a tongue groove. The edge groove comprises a flexible tongue arranged in an insertion groove. Said flexible tongue is configured to cooperate with the tongue groove for locking together the first and the second edges in a second direction which is perpendicular to the second main plane. The mechanical locking device comprises a first space, between the edge tongue and the edge groove, at an opening of the edge groove and at the junction plane, in a locked position of the first and the second edge. The first space may have the advantage that a loading of a part of the second edge at the opening of the edge groove is avoided. This part of the second edge may be a weak part, since little material is available to absorb a load.

The angle between the junction plane and the first main plane may be in a range of about 30° to about 60°, for example about 45°.

The edge tongue may extend, from the junction plane, essentially in the second direction, and preferably with a longitudinal direction along the first edge.

A first side of the edge tongue may comprise, at the junction plane, a first locking surface. The edge groove, at the junction plane, may comprise a second locking surface. The first locking surface and the second locking surface may be essentially parallel and may be configured to cooperate for locking in the first direction. The first locking surface and the second locking surface are preferably extending essentially in the second direction.

The edge tongue, at a second side, which is opposite the first side, may comprise a third locking surface and the edge groove may comprise a fourth locking surface. The third locking surface and the fourth locking surface may be essentially parallel and may be configured to cooperate, at a distance from the junction plane, for locking in the first direction. The third locking surface and the fourth locking surface are preferably extending essentially in the second direction.

The third locking surface and the fourth king surface may cooperate at an area, extending in the second, direction, over a first distance. The third locking surface and the fourth locking surface may be displaced from the junction plane by a second distance. The first distance may be within the range of about 20% to about 200% of the second distance, preferably within the range of about 50% to about 150% of the second distance. The first distance may be essentially the same as the second distance.

The first side of the edge tongue, at a distance from the junction plane, may comprise a fifth locking surface and the edge groove may comprise a sixth locking surface at a distance from the junction plane. The fifth locking surface and the sixth locking surface may be essentially parallel and may be configured to cooperate for locking in the first direction. The fifth locking surface and the sixth locking surface are preferably extending essentially in the second direction.

The mechanical locking device may comprise a first contact surface at the first edge and a second contact surface at the second edge. The first and the second contact surface may be at an outer corner, in a locked position of the first and the second panel, and may be in the junction plane. The first and the second contact surface may be configured to cooperate.

The mechanical locking device may comprise a second space extending in the junction plane from the first and the second contact surfaces and to an opening of the edge groove. The first and the second contact surfaces may be configured to cooperate over a first width, in a direction from an inner corner to the outer corner of the first and the second panel, said first width may be in the range of about 5% to about 40%, about 5% to about 30%, or about 5% to about 20% of an edge width of a first and/or second edge surface.

A first edge, surface and/or a second edge surface may comprise a recess extending from the first contact surface and the second contact surface, respectively, to the edge tongue and the edge groove, respectively.

The mechanical locking device may comprise a third contact surface at the first edge and a fourth contact surface at the second edge. The third and the fourth contact surface may be at an inner corner in a locked position of the first and the second panel. The third and the fourth contact surface may be in the junction planer and are preferably configured to cooperate.

The third and the fourth contact areas may be cooperating over a second width, in a direction from an inner corner to the outer corner of the first and the second panel. Said second width may be in the range of about 2% to about 20%, about 2% to about 10%, or about 2% to about 5% of an edge width of the first and/or second edge surface.

The first panel may comprise an inner half and an outer half in a direction of the thickness of the first panel. The entire edge tongue is preferably at the inner half of the first panel.

The insertion groove may be parallel to the second main plane or at an acute angle to the second main plane, such that a bottom of the insertion groove is at a greater distance from an inner face of the second panel than an opening of the insertion groove to the edge groove.

The insertion groove may extend along essentially the entire length of the edge groove.

The edge groove may extend long essentially the entire length of the second edge.

The flexible tongue may be displaceable ire the insertion groove.

A core material of the first and the second panel may comprise a wood fibre based board, such as a HDF, MDF, plywood, solid wood or particleboard, or a reinforced plastic board or a wood fibre composite board. The core may be provided with a decorative layer.

The locking device may comprise a bevel or rounding at an opening of the tongue groove. This may facilitate disassembling as the bevel or the rounding may prevent that the flexible tongue got stuck during the disassembling.

The locking device is preferably configured such that the flexible tongue moves out of the tongue groove when a tool is inserted into the tongue groove and pushed back into the insertion groove.

The first panel and the second panel are preferably configured to be assembled by displacing the first panel relative the second panel in the second direction, wherein the first panel is perpendicular to the second panel. The edge tongue is inserted into the edge groove, wherein the flexible tongue is pushed back into the insertion groove and springs back into the tongue groove to obtain a locked position.

The flexible tongue may be according to the flexible tongue described and shown in FIGS. 2A-2F or FIGS. 3A-3B in WO2015/105449. FIGS. 2A-2F and FIGS. 3A-3B, and the accompanying disclosure at page 6, line 15 to page 7, line 15, are hereby expressly incorporated by reference herein.

The set of panels may be furniture panels.

A second aspect of the invention includes an assembled furniture product comprising a corner of a frame comprising the set of panels as described above.

BRIEF DESCRIPTION OF THE DRAWINGS

Embodiments of the present invention will by way of example be described in more detail with reference to the appended schematic drawings, in which.

DETAILED DESCRIPTION

Figure 1:
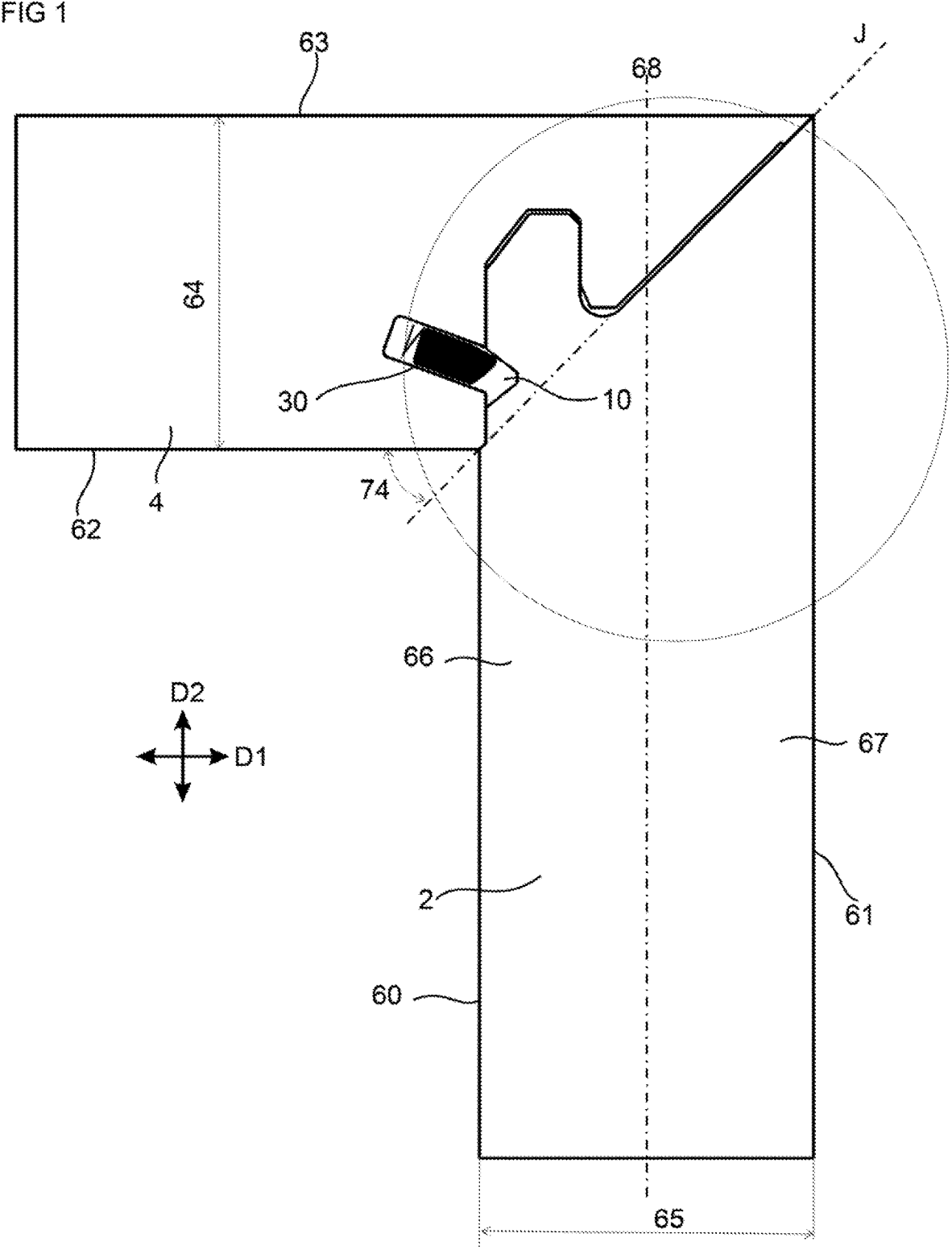
FIG. 1 shows an embodiment of the invention comprising the first panel and the second panel in a locked position.
Figure 2:
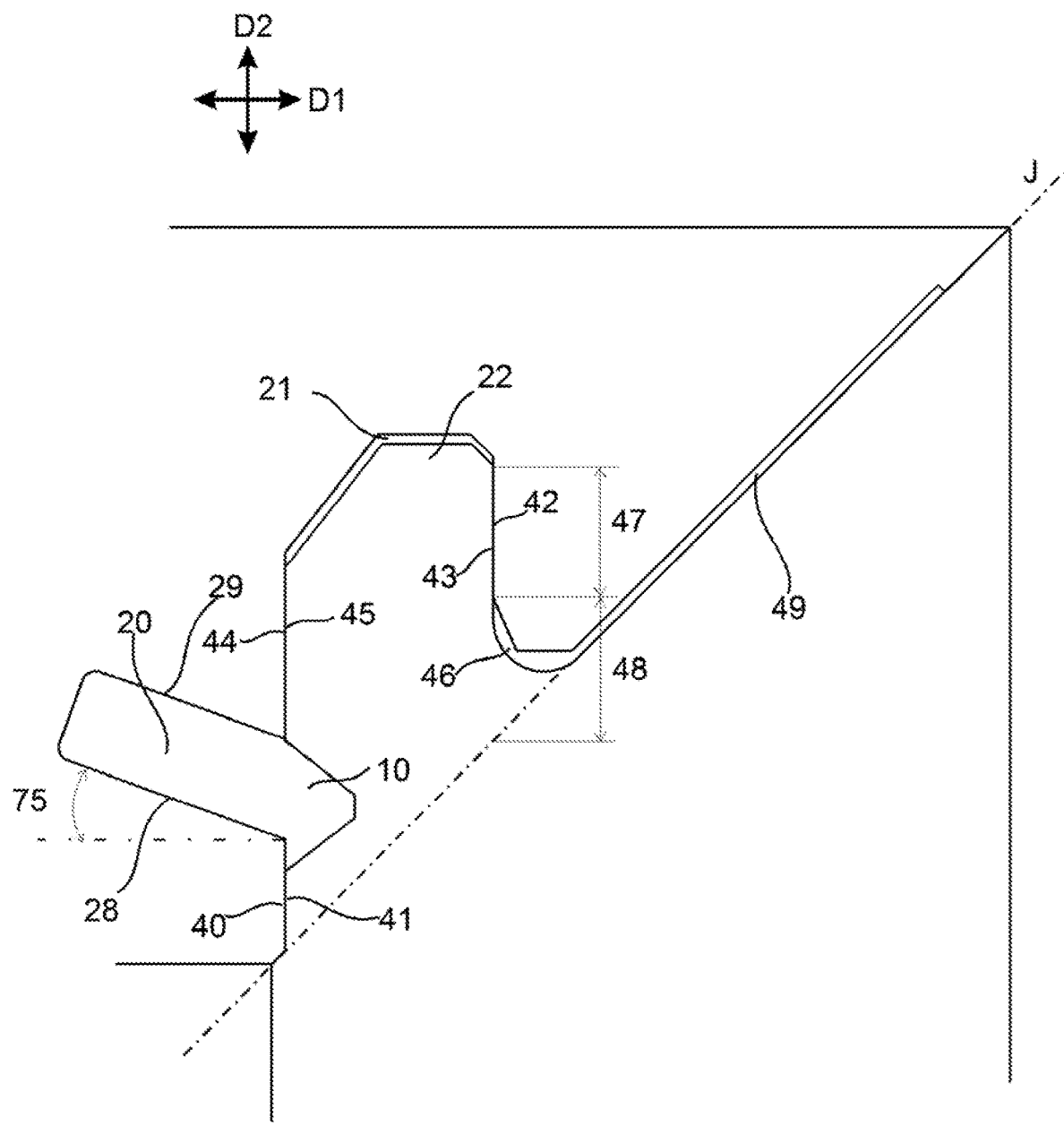
FIG. 2 shows an enlargement of the encircled area in FIG. 1 without the flexible tongue.

FIG. 1 and FIG. 2 show an embodiment including a set of panels comprising a first panel 2 with a first main plane and a second panel 4 with a second main plane. The first and the if second panel are provided with a mechanical locking device for locking a first edge of the first panel 2 to a second edge of the second panel 4 at a junction plane J. The first main plane is essentially perpendicular to the second main plane and the junction plane is extending between the first main plane and the second main plane. The panels are shown in a locked position in a crosscut view. A longitudinal direction of the first and the second edge are extending perpendicular to the view shown. The first edge comprises an edge tongue 22 that extends from the junction plane J. The second edge comprises an edge groove 21 at the junction plane, wherein the edge tongue is configured to cooperate with the edge groove for locking together the first and the second edges in a first direction D1 which is perpendicular to the first main plane. The edge tongue 22 comprises a tongue groove 10. The edge groove 21 comprises a flexible tongue 30 arranged in an insertion groove 20, said flexible tongue is configured to cooperate with the tongue groove 10 for locking together the first and the second edges in a second direction D2 which is perpendicular to the second main plane. The mechanical locking device comprises a first space 46 between the edge tongue 22 and the edge groove 21 at an opening of the edge groove 21 and at the junction plane in a locked position of the first and the second edge. The first space 46 may have the advantage that a loading of a part of the second edge at the opening of the edge groove is avoided. This part of the second edge may be a weak part, since little material is available to absorb a load. FIG. 2 shows an enlargement of the encircled area in FIG. 1 without the flexible tongue. The angle 74 between the junction plane and the first main plane may be in a range of about 30° to about 60°, for example about 45°. The edge tongue 22 preferably extends, from the junction plane, essentially in the second direction.

The first panel 2 has a first thickness 65 and the second panel 4 has a second thickness 64. The first and the second thickness may be essentially the same. The first panel 2 comprises an inner half 66, at a first side of a central plane 68 of the first panel, and an outer half 67, at second side of the central plane 68 of the first panel, in a direction of the thickness of the first panel. The entire edge tongue 22 is preferably at the inner half of the first panel. This may have the effect that more material is obtained between the edge groove 21 and an outer corner, in a locked position of the first and the second panel, which may increase the strength of the mechanical locking device. The first panel comprises an inner face 60 and an outer face 61. The second panel comprises an inner face 62 and an outer face 63.

FIG. 2 shows that first side of the edge tongue 22 may comprise, at or near the junction plane J, a first locking surface 41, and the edge groove 21 may comprises, at or near the junction plane J, a second locking surface 40. The first locking surface and the second locking surface are essentially parallel and are configured to cooperate for locking in the first direction. The first locking surface and the second locking surface are preferably extending essentially in the second direction. The edge tongue 22 at a second side, which is opposite the first side, may comprise a third locking surface 43 and the edge groove 21 may comprise a fourth locking surface 42, wherein the third locking surface and the fourth locking surface are essentially parallel and are configured to cooperate at a distance from the junction plane for locking in the first direction. The third locking surface and the fourth locking surface are preferably extending essentially in the second direction. The first, second, third and fourth locking surfaces may all be parallel to each other. Said parallel first, second, third, and fourth locking surfaces may have the advantage that panels are easy to assemble and that, e.g., a furniture comprising said set of panels may be more stable. The fourth locking surface 42 is preferably closer to the central plane 68 than the second locking surface 40.

The third locking surface 43 and the fourth locking surface 42 may cooperate, to absorb a load, at an area extending over a first distance 47 in the second direction. The third locking surface and the fourth locking surface are preferably displaced from the junction plane by a second distance 48. This may have the effect that more material is obtained, in the first direction D1, between the fourth locking surface 42 and the junction plane, which may increase the strength of the mechanical locking device. The first distance 47 may be within the range of about 20% to about 200% of the second distance 48 or within the range of about 50% to about 150% of the second distance 48. The first 47 distance is essentially the same as the second distance 48 in the embodiment shown in FIG. 2.

The first side of the edge tongue 2, at a distance from the junction plane, may comprise a fifth locking surface 45 and the edge groove 21 may comprise a sixth locking surface 44 at a distance from the junction plane J. The fifth locking surface and the sixth locking surface are essentially parallel and are preferably configured to cooperate for locking in the first direction. The fifth locking surface and the sixth locking surface are preferably extending essentially in the second direction. The insertion groove 20 is, in the embodiment shown FIG. 2, positioned between the sixth locking surface 44 and the second locking surface 40. The tongue groove 10 may be positioned between the fifth locking surface 45 and the first locking surface 41.

Figure 3A:
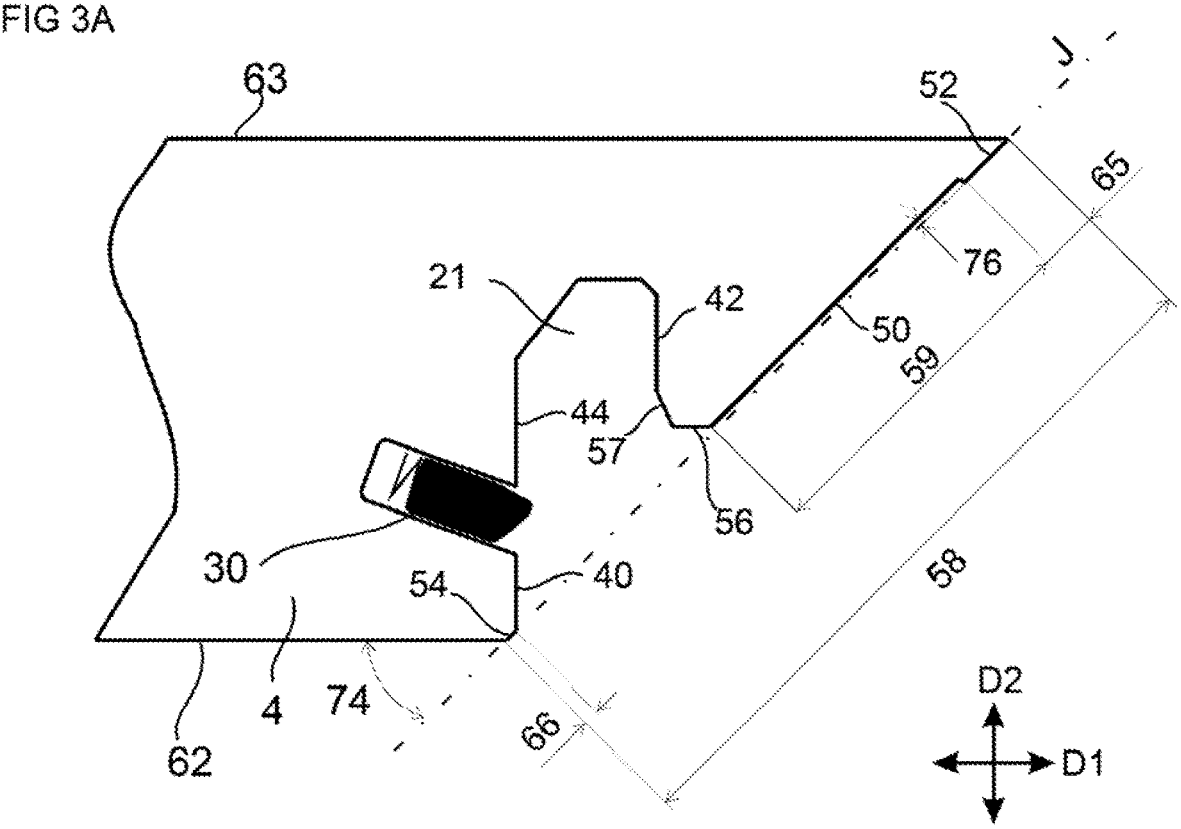
FIGS. 3A-3B show an embodiment of the invention comprising the first edge and the second edge.
Figure 3B:
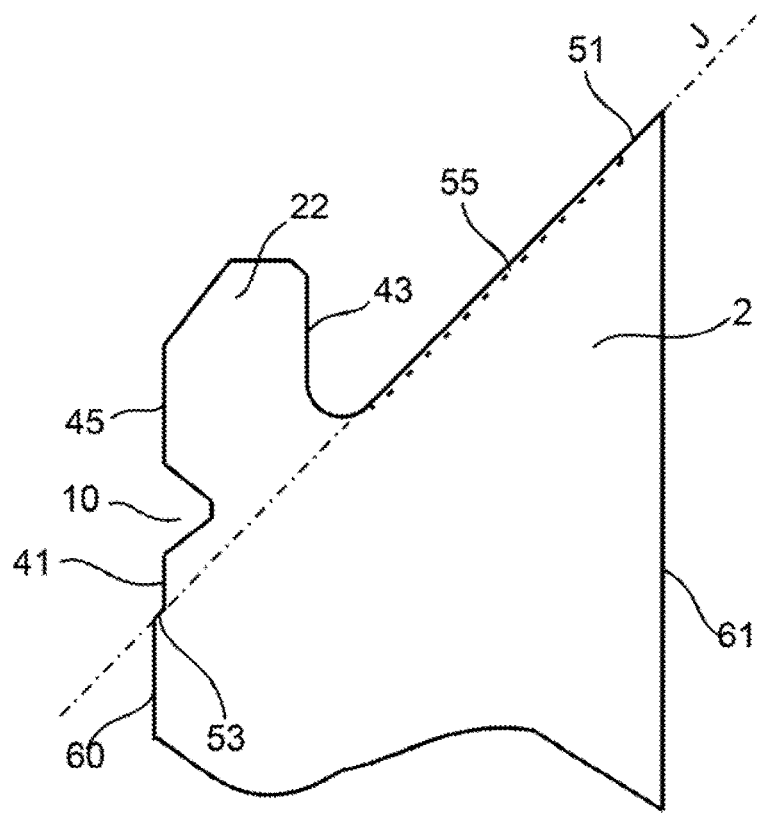

FIG. 3A-3B show an embodiment of the mechanical locking device, before assembling of the first and the second panel, comprising a first contact surface 51 at the first edge and a second contact surface 52 at the second edge. Said first and the second contact surface are at an outer corner, in an assembled and locked position of the first and the second panel, and in the junction plane, and are configured to cooperate. A second space 49 may extend in the junction plane from the first and the second contact surfaces 51,52 and to an opening of the edge groove, see FIG. 2. The second space 49 may extend in a longitudinal direction along the first edge, along the second edge, or along both the first edge and the second edge. The first and the second contact surfaces 51,52 may cooperate over first width 71, in a direction from an inner corner to the outer corner of the first and the second panel, wherein said first width is in the range of about 5% to about 40%, about 5% to about 30%, or about 5% to about 20% of an edge width 58 of a first and/or second edge surface of the first and the second edge, respectively. This may improve the contact between the first edge surface and the second edge surface, with increased pressure over smaller contacts areas, and irregularities, such as loose fibres that remains from a mechanical cutting of the mechanical locking device, in the first edge surface or the second edge surface are compressed and that a tight joint is obtained between the first and the second panel.

The first edge surface of the first edge may comprise a recess 55, indicated by a dotted line in FIG. 3B, extending from the first contact surface 51 to the edge tongue 22. The second edge surface of the second edge may comprise a recess 50, with a depth 76 and width 59, see FIG. 3A, extending from the second contact surface 52 to the edge groove 21. The depth 76 of the recess 50 of the second edge surface may be about in the range of about 0.1 mm to about 1 mm, preferably in the range of about 0.2 mm to about 0.5 mm. The recess 55 of the first edge surface may have the same depth and essentially the same length as the recess 50 of the first edge surface. The depth of the recess may be adjusted to the material of the core of the panel. Mechanical cutting of e.g. a core of a particle board may result in a rougher surface with protruding fibers than mechanical cutting of a core of a HDF board. A rougher surface may require an increased depth 76 of the recess of the first edge surface and/or the second edge surface.

The mechanical locking device may comprise a third contact surface 53 at the first edge and a fourth contact surface 54 at the second edge. The third and the fourth contact surfaces are at an inner corner, in a locked position of the first and the second panel, and in the junction plane and are configured to cooperate. The third and the fourth contact surfaces are cooperating over a second width 72, in a direction from an inner corner to the outer corner of the first and the second panel. The second width 72 may be in the range of about 2% to about 20%, about 2% to about 10%, or about 2% to about 5% of the edge width 58 of the first and/or second edge surface.

The first panel 2 and the second panel 4 are preferably configured to be assembled by displacing the first panel 2 relative the second panel 4 in the second direction D2, wherein the first panel is perpendicular to the second panel. The edge tongue 22 is inserted into the edge groove 21, wherein the flexible tongue 30 is pushed back into the insertion groove and springs back into the tongue groove 10 to obtain a locked position. The set of panels may be furniture panels.

The insertion groove 20 may extend along essentially the entire length of the edge groove.

The edge groove 21 may extend along essentially the entire length of the second edge in a longitudinal direction of the second edge.

The flexible tongue 30 may be displaceable in the insertion groove.

The locking device is preferably configured such that the flexible tongue 30 moves out of the tongue groove 10 when a tool is inserted into the tongue groove and pushed back into the insertion groove.

The insertion groove 20 may be parallel to the second main plane or at an acute angle 75 to the second main plane, such that a bottom of the insertion groove 20 is at a greater distance from an inner face 62 of the second panel than an opening of the insertion groove to the inner face 62.

The locking device may comprise a bevel or rounding at an opening of the tongue groove 10. This may facilitate disassembling as the bevel or the rounding may prevent the flexible tongue from getting stuck during the disassembling.

The set of panels as described above may be a part of an assembled furniture product, such as a corner of a frame. The tongue groove 10 may be open at a backside of the furniture, such that a tool may be inserted into the tongue groove to push, back the flexible tongue 30 into the insertion groove 20 and unlock the locking device.

A core material of the first and the second panel may comprise a wood fibre based board, such as a HDF, MDF, plywood, solid wood or particleboard, or a reinforced plastic board or a wood fibre composite board. The core may be provided with a decorative layer or layers. Parts of the locking device may be formed, preferably by mechanical cutting, such as milling, of material of the first and the second panel.

Figure 4A:
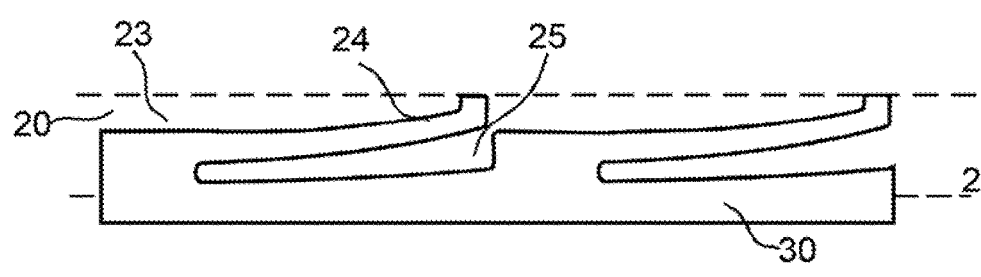
FIGS. 4A-4F shows part of the invention comprising an embodiment of the flexible tongue.
Figure 4B:
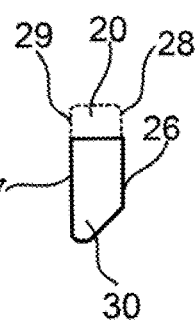
Figure 4C:
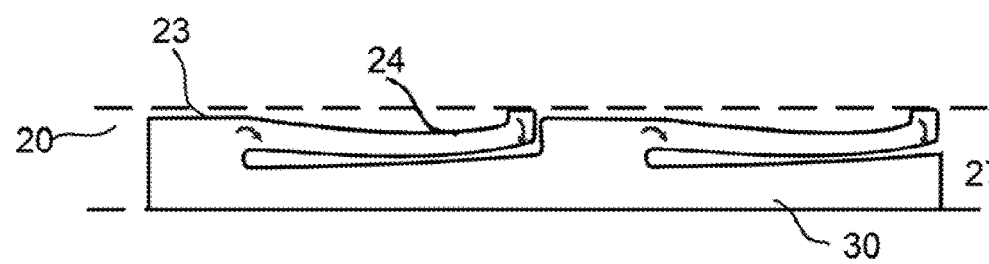
Figure 4D:
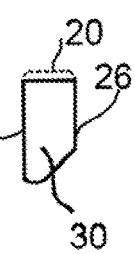

An embodiment of the flexible tongue 33, which is displaceable in an insertion groove 20, is shown in FIGS. 4A-4D. FIGS. 4A-4B show the flexible tongue 30 in a locked portion and FIGS. 4C-4D show the flexible tongue 30 during assembling of the first panel 2 and the second panel 4. FIG. 4B shows a cross section of the flexible tongue 30 in FIG. 4A. FIG. 4D shows a cross section of the flexile tongue 30 in FIG. 4C. The flexible tongue 30 comprises bendable protruding parts 24. A space 23 is provided between the flexible tongue 30 and a bottom wall of the insertion groove 20. FIG. 4C shows that the flexible tongue 30 is pushed into the insertion groove 20 and towards the bottom wall of the insertion groove 20 during an assembly of the first panel 2 with the second panel 4. The flexible tongue 30 springs back toward its initial position when the first panel 2 and the second panel 4 have reached a locked position. A recess 25 is preferably arranged at each bendable protruding part.

The flexible tongue 30 may have a first displacement surface 26 and an opposite second displacement surface 27, configured to be displaced along a third displacement surface 28 and a fourth displacement locking surface 29, respectively, of the insertion groove 20.

Figure 4E:
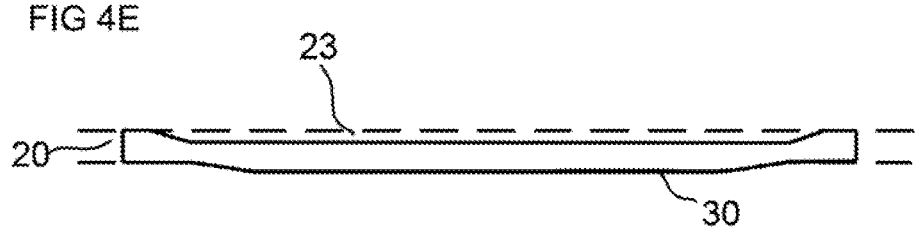
Figure 4F:
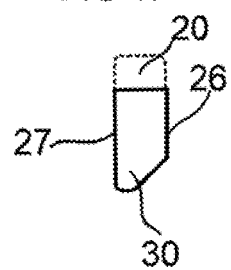

An alternative embodiment of the flexible tongue 30, without the protruding bendable parts 24, is shown in FIGS. 4E-4F. FIG. 4F shows a cross section of the flexible tongue 30 shown in FIG. 4E. The alternative embodiment is bendable in its length direction in order to accomplish a similar function as the embodiment shown in FIGS. 4A-4D.

When the word "about" is used in this specification in connection with a numerical value, is intended that the associated numerical value include a tolerance of ±10% around the stated numerical value.

EMBODIMENTS

1. A set of panels comprising a first panel (2) with, a first main plane and a second panel (4) with, a second main plane, wherein the first panel and the second panel are provided with a mechanical locking device for locking a first edge of the first panel (2) to a second edge of the second panel (4) at a junction plane (J), wherein the first main plane is essentially perpendicular to the second main plane and the junction plane is extending between the first main plane and the second main plane, characterized in that:
the first edge comprises an edge tongue (22) that extends beyond the junction plane (J),
the second edge comprises an edge groove (21) at the junction plane, wherein the edge tongue is configured to cooperate with the edge groove for locking together the first and the second edges in a first direction (D1) which is perpendicular to the first main plane,
the edge tongue (22) comprises a tongue groove (10),
the edge groove (21) comprises a flexible tongue (30) arranged insertion groove (20), said flexible tongue is configured to cooperate with the tongue groove (10) for locking together the first and the second edges in a second direction (D2) which is perpendicular to the second main plane,
the mechanical locking device comprises a first space (46) between the edge tongue (22) and the edge groove (21) at an opening of the edge groove (21) and at the junction plane in a locked position of the first and the second edge.

2. The set of panels as in embodiment 1, wherein the angle (74) between the junction plane and the first main plane, is about 45°.

3. The set of panels as in embodiment 1 or 2 wherein edge tongue (22) extends, from the junction plane, essentially in the second direction.

4. The set of panels as in any one of the preceding embodiments, wherein a first side of the edge, tongue (22) comprises, at or near the junction plane (J), a first locking surface (41), and the edge groove (21) comprises, at or near the junction plane (J), a second locking surface (40), wherein the first locking surface and the second locking surface are essentially parallel and are configured to cooperate for locking in the first direction, the first locking surface and the second locking surface are preferably extending essentially in the second direction.

5. The set of panels as in any one of the preceding embodiments, wherein the edge tongue (22) at a second side, which is opposite the first side, comprises a third locking surface (43) and the edge groove (21) comprises a fourth locking surface (42), wherein the third locking surface and the fourth locking surface are essentially parallel and are configured to cooperate at a distance from the junction plane for locking in the first direction, the third locking surface and the fourth locking surface preferably extend essentially in the second direction.

6. The set of panels as in embodiment 5, wherein the third locking surface (43) and the fourth locking surface (42) cooperate at an area extending over a first distance (47) in the second direction, wherein the third locking surface and the fourth locking surface are displaced from the junction plane by a second distance (48), wherein the first distance (47) is within the range of about 20% to about 200% of the second distance (48) or within the range of about 50% to about 150% of the second distance (48).

7. The set of panels as in any one of the preceding embodiments, wherein the first side of the edge tongue (22), at a distance from the junction plane, comprises a fifth locking surface (45) and the edge groove (21) comprises a sixth locking surface (44) at a distance the junction plane (J), wherein the fifth locking surface and the sixth locking surface are essentially, parallel and are configured to cooperate for locking in the first direction the fifth locking surface and the sixth locking surface preferably extend essentially in the second direction.

8. The set of panels as in any one of the preceding embodiments, wherein the mechanical locking device comprises a first contact surface (51) at the first edge and a second contact surface (52) at the second edge, the first contact surface and the second contact surface are at an outer corner, in a locked position of the first and the second panel, and in the junction plane and are configured to cooperate.

9. The set of panels as embodiment 8, wherein the mechanical locking device comprises a second space (49) extending in the junction plane from the first and the second contact surfaces (51,52) and to an opening of the edge groove.

10. The set of panels as in embodiment 8 or 9, wherein the first and the second contact surfaces (51,52) are cooperating over a first width (71), in a direction from an inner corner to the outer corner of the first and the second panel, wherein said first width is in the range of about 5% to about 40%, about 5% to about 30%, or about 5% to about 20% of an edge width (58) of the first and/or second edge surface.

11. The set of panels as in any one of the embodiments 8-10, wherein the first edge surface and/or the second edge surface comprises a recess (50,55) extending from the first contact surface (51) and the second contact surface (52), respectively, to the edge tongue (22) and the edge groove (21), respectively.

12. The set of panels as in any one of the preceding embodiments, wherein the mechanical locking device comprises a third contact surface (53) at the first edge and a fourth contact surface (54) at the second edge, the third and the fourth contact surface are at an inner corner, in a locked position of the first and the second panel, and in the junction plane, and are configured to cooperate.

13. The set of panels as in embodiment 12 wherein the third and the fourth contact areas are cooperating over a second width (72), in a direction from an inner corner to the outer corner of the first and the second panel, said second width may be in the range of about 2% to about 20%, about 2% to about 10%, or about 2% to about 5% of an edge width (58) of the first and/or second edge surface.

14. The set of panels as in any one of the preceding embodiments, wherein the first panel comprises an inner half (66) and an outer half (67) in a direction of a thickness of the first panel, wherein the entire edge tongue (22) is at the inner half of the first panel.

The invention claimed is:

1. A set of panels forming a corner joint having an inner corner joint portion and an outer corner joint portion, comprising a first panel with an outer surface defining a first main plane and a second panel with an outer surface defining a second main plane, wherein the first panel and the second panel are provided with a mechanical locking device for locking a first edge of the first panel to a second edge of the second panel at a junction plane, and wherein the first main plane is essentially perpendicular to the second main plane and the junction plane is extending between the first main plane and the second main plane, wherein the first edge comprises an edge tongue that extends beyond the junction plane, wherein the second edge comprises an edge groove at the junction plane, wherein the edge tongue is configured to slidably engage with the edge groove for locking together the first and the second edges in a first direction which is perpendicular to the first main plane, wherein the edge tongue has an inner corner portion facing the inner corner joint portion and an outer corner portion facing the outer corner joint portion, and the edge tongue comprises a tongue groove on the inner corner portion of the edge tongue, wherein the edge groove has an inner corner portion facing the inner corner joint portion and an outer corner portion facing the outer corner joint portion, and the edge groove comprises a flexible tongue arranged in an insertion groove on the inner corner portion of the edge groove, and said flexible tongue is configured to engage with the tongue groove for locking together the first and the second edges in a second direction which is perpendicular to the second main plane when the first and second edges are locked together, wherein the mechanical locking device comprises a first space between the edge tongue and the edge groove at an opening of the edge groove and at the junction plane on the outer corner portion of the edge tongue in a locked position of the first and the second edge, wherein a first side of the edge tongue adjacent the tongue groove comprises, at or near the junction plane, a first locking surface, and a first side of the edge groove adjacent the insertion groove comprises, at or near the junction plane, a second locking surface, wherein the first locking surface and the second locking surface are essentially parallel and are configured to slidably engage for locking in the first direction when the first and second edges are locked together, wherein the edge tongue at a second side adjacent the first space, which is opposite the first side, comprises a third locking surface and the edge groove at a second side adjacent the first space comprises a fourth locking surface, wherein the third locking surface and the fourth locking surface are essentially parallel and are configured to slidably engage at a distance from the junction plane for locking in the first direction when the first and second edges are locked together, and wherein the first locking surface and the third locking surface are essentially parallel.

2. The set of panels as claimed in claim 1, wherein the angle between the junction plane and the first main plane is about 45°.

3. The set of panels as claimed in claim 1, wherein edge tongue extends, from the junction plane, essentially in the second direction.

4. The set of panels as claimed in claim 1, wherein the third locking surface and the fourth locking surface engage at an area extending over a first distance in the second direction, wherein the third locking surface and the fourth locking surface are displaced from the junction plane by a second distance, wherein the first distance is within the range of about 20% to about 200% of the second distance.

5. The set of panels as claimed in claim 1, wherein the first side of the edge tongue, at a distance from the junction plane, comprises a fifth locking surface and the first side of the edge groove comprises a sixth locking surface at a distance from the junction plane, wherein the fifth locking surface and the sixth locking surface are essentially parallel and are configured to engage for locking in the first direction.

6. The set of panels as claimed in claim 1, wherein the mechanical locking device comprises a first contact surface at the first edge and a second contact surface at the second edge, the first contact surface and the second contact surface are at an outer corner, in a locked position of the first and the second panel, and in the junction plane and are configured to engage.

7. The set of panels as claimed in claim 6, wherein the mechanical locking device comprises a second space extending in the junction plane from the first and the second contact surfaces and to an opening of the edge groove.

8. The set of panels as claimed in claim 6, wherein the first and the second contact surfaces are engaged over a first width, in a direction from an inner corner to the outer corner of the first and the second panel, wherein said first width is in the range of about 5% to about 40% of an edge width of the first and/or second edge surface.

9. The set of panels as claimed in claim 6, wherein the first edge surface and/or the second edge surface comprises a recess extending from the first contact surface and the second contact surface, respectively, to the edge tongue and the edge groove, respectively.

10. The set of panels as claimed in claim 6, wherein the mechanical locking device comprises a third contact surface at the first edge and a fourth contact surface at the second edge, the third and the fourth contact surface are at an inner corner, in a locked position of the first and the second panel, and in the junction plane, and are configured to engage.

11. The set of panels as claimed in claim 10, wherein the third and the fourth contact surfaces are engaged over a second width, in a direction from an inner corner to the outer corner of the first and the second panel, wherein said second width is in the range of about 2% to about 20% of an edge width of the first and/or second edge surface.

12. The set of panels as claimed in claim 1, wherein the first panel comprises an inner half and an outer half in a direction of a thickness of the first panel, wherein the entire edge tongue is at the inner half of the first panel.

13. The set of panels as claimed in claim 1, wherein the edge tongue includes an outermost surface which is closest to, and spaced from, an innermost surface of the edge groove when the first and second edges are locked together.

* * * * *